Figure 1:
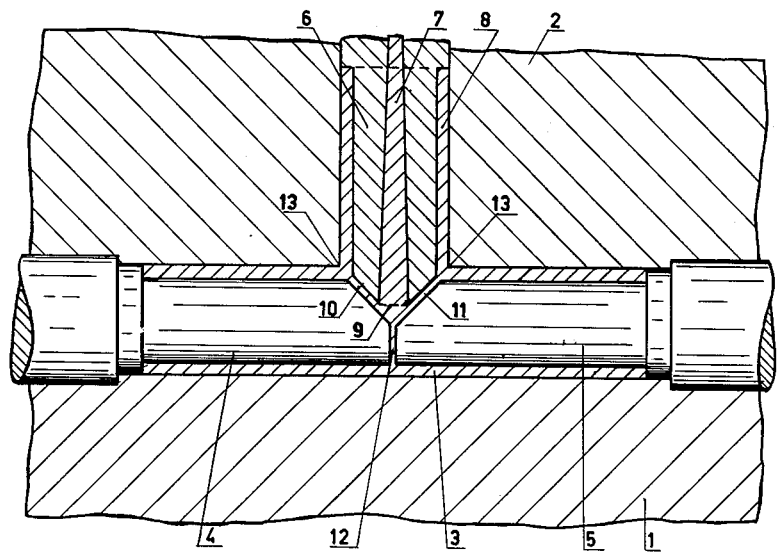

June 4, 1963     D. BILDERBEEK     3,092,441
PLASTIC MOULDING
Filed May 24, 1961

United States Patent Office 3,092,441
Patented June 4, 1963

3,092,441
PLASTIC MOULDING
Derk Bilderbeek, Arnhem, Netherlands, assignor to W. J. Stokvis Koninklijke Fabriek van Metaalwerken, Arnhem, Netherlands, a corporation of the Netherlands
Filed May 24, 1961, Ser. No. 112,382
Claims priority, application Netherlands May 25, 1960
4 Claims. (Cl. 18—55)

The invention relates to a method for injection moulding or transfer moulding a plastic object, in which said object is composed of a plurality of mainly cylindrical hollow parts having intercrossing or intersecting axes, and a composite object moulded according to said process.

More particularly the invention relates to the improvement of the quality of composite mouldings made out of materials which are difficult to treat such as for instance hard polyvinyl chloride.

The injection moulding or transfer moulding of hollow cylindrical mouldings in itself has its problems.

In the known methods of injection moulding somewhere on the cylinder wall so-called flow lines occur, mainly along a generatrix of this wall opposite the sprue.

Such a seam will always form a weak spot in the cylindrical wall. In composite mouldings, such as for instance T-fittings, an injection place of frequent occurrence is at the back of the run opposite the side outlet of the T.

However, in this case the flow lines will be formed in a very unfortunate place, i.e. in the angle between the run and the side outlet, exactly where such a fitting will receive the heaviest load.

Another known place of injection is for instance at the side edge of the run, i.e. shifted 90° with respect to the first-mentioned injection place. Although in this case the flow lines are in a slightly less unfavourable position, in actual fact they always form weak spots.

In the same way any other sprue on the outer wall that has been in use up till now in principle has the same drawbacks.

It is known in injection moulding cylinders-, rim- or hub-shaped objects to prevent the ocurrence of flow lines by the application of an axial sprue, whereby the material is distributed radially from the sprue of the object to be formed and at the same time over the whole of the cylinder wall.

The material sprued then flows in axial direction along the core, not around it (see for instance I. Thomas—Injection Molding of Plastics, 1947, page 361).

This so-called "disc gate moulding" (or maybe a plurality of small radial sprues to the cylinder periphery) can be placed at the end as well as somewhere within the cylindrical wall, the latter being preferred for instance when desirable with a view to release or round angles.

However, the above concerns a simple moulding and this method is not suitable for the sprueing of the aforesaid composite moulding without being modified.

With the method according to the invention it is now possible to make a composite moulding, in which the drawbacks before-mentioned are avoided, and in which the above-described method for injection moulding a simple moulding can be used to advantage.

According to the invention the filling of the mutual composing parts of said moulding is effected in a place in or near the intersecting point of the centre lines, or in or near the centre of the planes intersecting the said parts.

In connection herewith the cores that serve to form the recesses in the composing parts of the moulding, are profiled at their ends directed towards one another in such a way that slit-shaped channels are formed from the first-named place to the cylinder walls of the composing parts.

For the supply of the moulding material to this central filling place it will be advantageous to use a sprue bushing through one of the cores, which sprue bushing is connected to the injection moulding cylinder.

It is also possible to execute the injection moulding nozzle of the injection moulding machine in such a way that it can be used as a perforated core.

Further, the material supply to the said filling place can also be effected through the outer wall of the moulding, for instance, as described hereinbefore, on the back of the run, as is usual in injection moulding, provided that from this point the material is mainly conveyed by way of a suitably shaped channel or channels to the above-mentioned central filling place, in order from there to run through the aforesaid slit-shaped channels to fill the mould cavity.

According to the above-mentioned methods each of the composing parts of the moulding is filled in an even way in axial direction along the core, and flow lines will be avoided.

In this manner it is at the same time achieved that the filling of these parts will take place simultaneously or substantially simultaneously, and that the flows will become shorter.

The result hereof is that at least from the point of view of moulding technique the wall thickness of the moulding can be smaller.

In injection moulding material having a very small temperature range for working up, such as for instance hard polyvinyl chloride, the advantages mentioned are of special importance.

When the temperature of this material is too low, injecting into the mould cavity will become substantially impossible, whilst on the other hand at too high a temperature decomposition of the material will occur.

Particularly when hard polyvinyl chloride was used it appeared that, with the methods used up till now for the injection moulding of composite mouldings, the resulting flow lines unfavourably influenced the strength.

The runner partitions formed when using the method according to the invention are removed after the injection moulding has been finished.

As mentioned hereinbefore, the above-indicated method for injection moulding also relates to the transfer moulding of plastics.

The method according to the present invention will hereinafter be further explained and illustrated with the aid of a drawing, in which, by way of example, are represented two embodiments of a device for carrying out this method.

Hereby FIG. 1 gives an axial cross-section of a mould for injecting a T-fitting of hard polyvinyl chloride.

The mould is composed of the block-shaped mould-halves 1 and 2 and for the formation of the run 3 of the T-fitting the pertaining mould cavity is provided with cores 4 and 5.

The core 6, provided with the sprue bushing 7, which communicates with the injection moulding cylinder (not shown), serves as third core for the formation of the side outlet 8 of the T-fitting.

As is apparent from the drawing, the length of the cores 4, 5 and 6 is chosen in such a way that, after the mould has been placed and closed, they do not touch each other.

The ends of the cores 4, 5 and 6 that are directed towards each other, are shaped in such a manner that the nozzle 9 of the sprue bushing 7, and therefore also the injection place lie in the intersection point of the centre lines of the cylindrical parts of the T-fitting, and that from this point between the ends of the cores, the slit-shaped channels 10, 11 and 12 are formed.

Hereby the channels 10 and 11 run towards the angle 13 to be formed and the channel 12 runs towards the cylinder wall of the run 3 which is to be formed diametrically opposed to these.

Now, when injecting, the moulding compound which is pressed through the channel 7, will be sprued through the nozzle 9 radially through the said slit-shaped channels towards the cylinder wall of the T-fitting which is to be formed.

Therefore, in this manner a filling of the mould is achieved from a point which is centrally situated with regard to the T-fitting to be formed, and the various parts are simultaneously filled.

The run and the side outlet of the T-fitting and their junction are evenly filled along the respective cores in axial direction, and as a result flow lines are avoided.

Instead of in the side outlet of the T-fitting to be formed, the perforated core 6 can also be provided in one of the cylindrical parts of the run 3 which are to be formed, and it can be sprued in this manner.

In order in this manner to obtain an identical filling, the ends of the cores which are directed towards one another should in this case be profiled accordingly.

Figure 2:
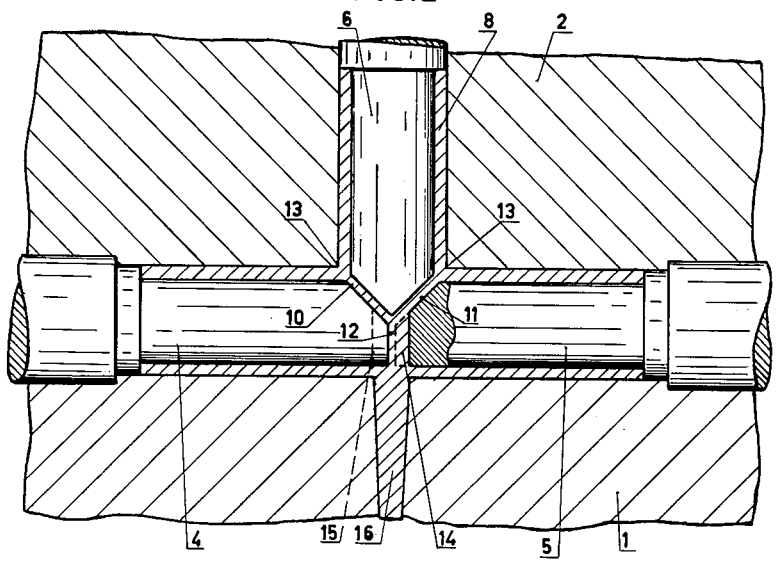

FIG. 2 gives an embodiment, in which the injection moulding compound is conveyed to the aforesaid central injection place, not by a perforation in one of the cores, but from the outer wall of the moulding to be formed.

The cores 10 and 11 are to this end provided at their front sides with grooves 14 or 15 preferably having mainly half cylindrical cross-sections, whereby these grooves that are positioned opposite one another together form a channel, which is connected to the supply channel 16 provided in the mould half 1, which in turn communicates with the front side of the injection moulding cylinder (not shown).

The diameter of the channel formed by the grooves 14 and 15 is chosen to be much larger than the wall thickness of the T-fitting to be moulded, so that the moulding material supplied by the supply channel 16, is mainly conveyed to the central injection place, and therefrom, by the slit-shaped channels 10, 11 and 12, evenly fills the moulding cavity in the above-described manner.

After the release of the T-fitting from the mould halves and the removal of the cores, either the sprue formed by the channel 7 (FIG. 1), or the one formed by the channel 16 (FIG. 2) will have to be removed, and the runner partitions formed by the slit-shaped channels are taken away, for instance by a milling treatment.

I claim:

1. In a method of moulding a hollow thermoplastic article having walls and intersecting axes remote from and within said walls, the step of forming said article by distributing thermoplastic material to a mould from inside said article in the region of said intersecting axes remote from and within said walls.

2. A method according to claim 1 in which thermoplastic material is supplied to an interior distribution region through a sprue bushing in a core which forms a recess in an article to be moulded.

3. A method according to claim 1 in which thermoplastic material is supplied to an interior distribution region through a wall of a hollow article to be moulded.

4. An article made by the method of claim 1.

References Cited in the file of this patent
UNITED STATES PATENTS

| | | |
|---|---|---|
| 2,079,393 | Benge | May 4, 1937 |
| 2,207,600 | Seaver | July 9, 1940 |
| 2,293,633 | Shaw | Aug. 18, 1942 |
| 2,477,368 | Gits | July 26, 1949 |
| 2,696,023 | Stott | Dec. 7, 1954 |